United States Patent [19]

Ullmann et al.

[11] 4,045,641

[45] Aug. 30, 1977

[54] CONTROL SYSTEM FOR AN ELECTRO-EROSION MACHINE TOOL

[75] Inventors: Werner Ullmann, Locarno; Bernardo Ferroni, Ascona; Gideon N. Levy, Losone, all of Switzerland

[73] Assignee: A.G. fur industrielle Elektronik AGIE Losone b. Locarno, Losone, Switzerland

[21] Appl. No.: 641,241

[22] Filed: Dec. 16, 1975

[30] Foreign Application Priority Data

Feb. 20, 1975 Switzerland ........................ 2110/75

[51] Int. Cl.$^2$ ................................................ B23P 1/08

[52] U.S. Cl. ................................ 219/69 C; 219/69 M

[58] Field of Search ................. 219/69 C, 69 M, 69 G

[56] References Cited

U.S. PATENT DOCUMENTS

| | | | |
|---|---|---|---|
| 3,816,692 | 6/1974 | Ratmansky | 219/69 C |
| 3,838,337 | 9/1974 | Halbleib | 219/69 P |
| 3,859,186 | 1/1975 | Ullmann et al. | 219/69 M |
| 3,875,362 | 4/1975 | Balleys | 219/69 M |
| 3,875,374 | 4/1975 | Inoue | 219/69 C |
| 3,912,898 | 10/1975 | Pfau | 219/69 M |
| 3,975,607 | 8/1976 | Ullmann et al. | 219/69 C |

OTHER PUBLICATIONS

J. M. Idelsohn, "10 Ways to Find the Optimum", Control Engineering, June 1964.

*Primary Examiner*—Bruce A. Reynolds
*Attorney, Agent, or Firm*—Flynn & Frishauf

[57] ABSTRACT

A control system, for a machine tool of the kind in which electrical energy passes across a gap between a tool electrode and a workpiece to erode the workpiece, comprises means for forming signals representative of the rate of erosion of the workpiece and the rate of undesirable erosion or "wear" of the tool electrode, and a computer means which receives the signals and combines them with a signal received from a data input device, which signal represents a desired optimum relationship between the two rates of erosion, and forms an appropriate output signal for controlling the machine tool. The data input device is usable, in rough machining operations where the tool electrode may be relatively cheaper than machine time, to ensure that machining is done in the shortest time by allowing a relatively high rate of tool wear and, in fine machining where the tool electrode is expensive, to ensure minimal tool wear at the cost of machine time.

7 Claims, 1 Drawing Figure

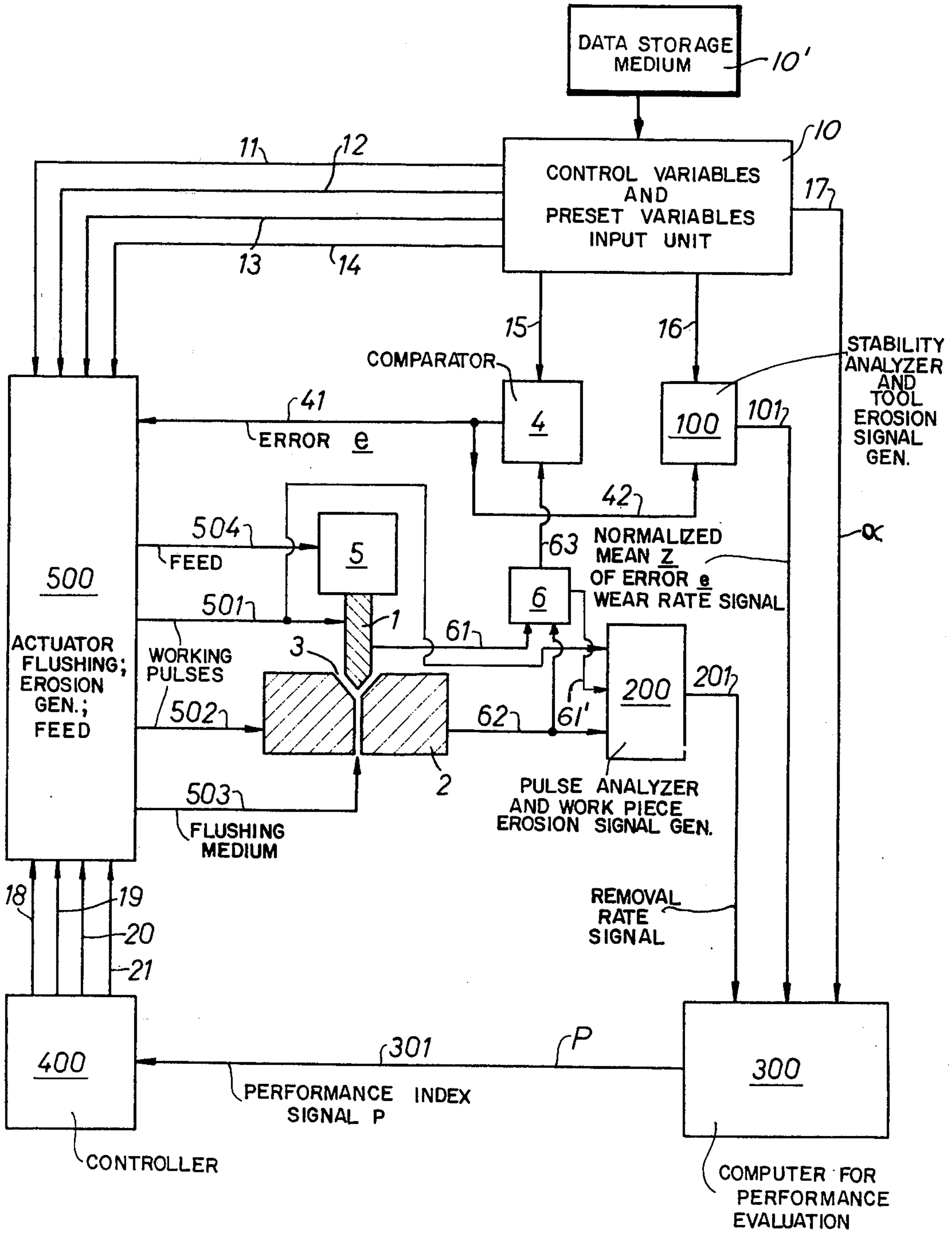

DATA STORAGE MEDIUM
10'
10
CONTROL VARIABLES AND PRESET VARIABLES INPUT UNIT
11
12
13
14
15
16
17
COMPARATOR
4
100
STABILITY ANALYZER AND TOOL EROSION SIGNAL GEN.
41
ERROR e
42
101
α
504
FEED
5
500
ACTUATOR FLUSHING; EROSION GEN.; FEED
501
WORKING PULSES
1
3
63
NORMALIZED MEAN Z OF ERROR e
WEAR RATE SIGNAL
6
61
61'
62
200
201
502
503
2
FLUSHING MEDIUM
PULSE ANALYZER AND WORK PIECE EROSION SIGNAL GEN.
18
19
20
21
REMOVAL RATE SIGNAL
400
301
P
300
PERFORMANCE INDEX SIGNAL P
CONTROLLER
COMPUTER FOR PERFORMANCE EVALUATION

CONTROL SYSTEM FOR AN ELECTRO-EROSION MACHINE TOOL

INTRODUCTION

The present invention relates to a system for controlling the machining process of an electro-erosion machine tool to give optimum operating conditions, based on signals collected at the working gap, which said working gap is constituted by at least one tool electrode and at least one workpiece electrode.

In consequence of the accuracy, which improves from year to year, of electro-erosive machining and the improvement of power generators, new fields for the utilisation of such machining are continously and progressively being found. The pre-requisite for this is, of course, enhanced flexibility in the machining process with an increased, controllable number of the associated operating parameters. However, this means that work preparation and control of the erosion process become continuously more complex. Past investigations into the technology of electro-erosion machining has made available tables of standard guiding or datum values for the setting of parameters such as the voltage or current amplitude and the width of the working pulses for particular operations and, using these tables, the desired machining result can be achieved. However, the parameters are given only for standardised and simple working conditions and so, for the majority of erosion processes, they serve merely as a basis for so called "work planning", in which experience and additional considerations (generally of an economic nature) are also taken into account, for the erosion work concerned. In the work planning, the technically and/or economically most advantageous material pairing of the workpiece electrode and the tool electrode, the dielectric flushing or scavenging medium to be employed, and also the dividing-up of the entire erosion process into working stages such as roughing, first-finishing, finishing and fine finishing, are determined. Each of these working stages has its own special characteristics of which account should be taken if the machining process is to be optimised and, therefore, a work plan is prepared for each stage. Of course, the different work plans are not entirely independent from one another but are each prepared with the other stages in mind and are very precisely synchronised one to another so as to achieve the desired result. Among the differences which occur between the different stages is the tool electrode dimension in relation to the shape to be machined. For example, if the tool electrode is to enter the workpiece to machine a recess, hole or the like therein, so that the result is that during machining the workpiece surrounds part of the tool (as opposed to machining of the kind where the tool electrode surrounds or encloses part of the workpiece so as to machine a desired outer shape of the workpiece) then, since a gap is maintained between the tool electrode and the workpiece, the tool electrode must be undersized in relation to the desired shape to be machined and the amount of this undersize differs for the different stages, being a maximum for coarse machining or "roughing" and a minimum for fine machining or "finishing". Furthermore, during roughing it may not be necessary for the shape of the tool electrode to be reproduced very precisely in the workpiece whereas this is necessary for finishing. Thus, the roughing tool electrode can be made to less precise dimensions than the finishing electrode and is hence much cheaper to produce. While in electrode-erosion machining, while the workpiece is eroded by the electrical discharges passing between it and the tool electrode, the tool electrode also undergoes erosion or "wear" at a rate depending upon the rate or erosion of the workpiece, i.e. the speed of machining. While the various other operating parameters can be optimized to allow the machining speed to be increased with as low a consequent increase in the tool wear rate as is possible, it is always a fact even with such optimised parameters that, the higher the speed of machining, the higher is the rate of tool wear. As a consequence of the above described factors, it may be that, during roughing for which the tool electrode is relatively cheap, it is best to perform the machining as quickly as possible (within limits), while accepting the consequent high rate of tool wear, on the ground that the machine time is relatively more expensive than the costs involved in replacing the tool more frequently, whereas the converse may apply in finishing for which the tool electrode is often very expensive to produce, i.e. here it may be best to machine at a lower speed so as to reduce the amount of wear of the tool electrode.

The various operating parameters may be divided into two groups. The first group (which will be called "preset variables") are determined during work planning but, once set, must be kept constant during each stage of machining since variation thereof would mean deviation from the desired finished dimension (end geometry), or a change in precision, shape, tolerance and roughness of the surface. To this group belong the current and voltage amplitude of the working discharge pulses, the width or chronological duration of such working pulses, and also the energy thereof and the desired voltage. The second group of parameters (which will be called "control variables") are set to predetermined values at the start of machining but then must be so varied while machining is occurring that an optimum degree of efficiency is achieved within each working stage. To this second group belong the throughflow quantity, or the pressure, of the dielectric flushing or scavenging medium, the duty factor and the repetition frequency of the working pulses, the duration of the period between the working pulses, and the frequency of periodic withdrawals from the workpiece of the tool electrode. Furthermore, there also belongs to the second group the servo-amplification, i.e. the feed sensitivity, of the drive means which advance the tool electrode and workpiece towards each other. This second group of operating parameters have an effect on the speed of machining and on the wear of the tool electrode.

After effecting the work planning, it is possible to commence the erosion process proper. For this purpose, the preset variables and control variables are set at the erosion installation and also the desired material pairings of the electrodes are effected. During the erosion process, the control variables must be so readjusted that the erosion process has its best efficiency within each working stage (coarse erosion, finishing, fine finishing). From the foregoing remarks, the high degree of complexity of the control system of a modern erosion installation will be appreciated. Thus, various control systems have become known, which are intended to reduce the control problems of the erosion process proper and to guarantee optimum operational behaviour. A known control installation (described in "Aachener Werkzeugkolloquim", June 1974 under the direction of the Technological University Aachen, Germany, Laboratory for machine tools and plant operations, and published by "Industrie Anzeiger, Nrs. 70, 74, 78, 83, 88, 92, pp. 1706–1710 in 1974, with extensive bibliography) controls the ratio of the idle travel pulses to the true working pulses. In the working gap, the number of idle travel pulses and of the working pulses jumping over the working gap is counted and the ratio is formed. A reference value of this ratio is obtained from the previously mentioned technology tables and the mean working voltage of the working gap is so controlled, as desired value, that the actual ratio of the idle travel pulses to the working pulses at the working gap is equal to the reference value thereof. However, as mentioned before, the tables only give values for simple, idealised working condition. Also, since the mean working voltage is controlled as desired value, a non-existing error is simulated as soon as the desired value of the mean working voltage is varied as control variable. Since the idle travel ratio represents a control variable only with reference to removal, and other disturbances or failures, such as for example short circuit or arcs or even merely a tendency thereto, and which results in increased wear at the tool electrode, are not detected, the known control system has the disadvantages that the removal capacity and the wear deviate from the known, pre-programmed values of the work planning associated with the pre-selected desired value voltage. The result of this is undesirable enlargement of diminution of the working gap, so that at the end of the erosion process geometry errors in the eroded workpiece elements result. These geometry errors are further promoted due to non-detection of the momentary wear at the tool electrode.

A further known control system ("Elektroanzeiger" 26, 1973, No. 17, pages 348–351) represents an improvement to some degree and employs as control variable the operative ratio (number of working pulses jumping over the working gap to the pulses generated by the erosion generator), the firing-delay time in the working pulses, and also the conductivity of the dielectrical flushing medium and the regulating speed of the feed device. Since, in these known control systems, the mean working gap voltage serves as desired value, a non-existing error is simulated. Thereby, indirectly, the correction behaviour of the servo-circuit is influenced. This, in turn, leads to undesirable deviations in the removal capacity and in wear, which are associated with the desired value voltage already pre-programmed in the work planning, and also to geometry errors which are reinforced due to non-detection of the wear at the tool electrode.

It is the object of the present invention to mitigate the above-discussed disadvantages of the known control systems and to reduce the constrained and disadvantageous influence of the various working stages of the erosion process on process optimisation, so that the optimum operating parameters already pre-programmed in the work planning remain optimum during the entire erosion process and the desired final dimension of the workpiece available in the finished state subsequent to the erosion process is achieved as it was pre-planned, i.e. so that chance incidents due to the complexity of the erosion process are eliminated, so that costly after-machining or renewed manufacture of the workpiece becomes unnecessary.

The invention has a further object, i.e. to optimise the erosion process not only to be technically optimum, but also from the economic aspect. In the work planning, it is already possible to determine how the erosion process, and in particular its individual work stages, can be performed most advantageously from the economic aspect. For example, if during coarse erosion the most expensive component is the machine time, then the operation is performed to be removal-intensive, inasmuch as the electrode required for coarse erosion is inexpensive to manufacture, since no special demands are made on the geometry thereof. In another machining stage, for example finishing or very fine erosion, the electrode is more costly than the machine hours, so that in this case it is necessary to operate in a low wear manner. These economic considerations are, as already stated, taken into account during work planning by corresponding determination of the two groups (setting variables, control variables) of operation parameters. It is then required of the control system or regulating system of the erosion installation that it should cause the erosion process to take place also in the manner for which it was pre-planned or pre-programmed with regard to its details.

A further object of the invention is to provide with simple components, a device which solves the problem mentioned, to permit already existing control systems for erosion plant to be expanded in such manner as to produce the system according to the invention.

Subject manner of the invention: The control system for a machine tool of the kind in which electrical energy is passed across a working gap between a tool electrode and a workpiece so as to machine the workpiece by eroding it, comprises a. tool erosion signal means for forming a signal representative of the rate of erosion of the tool electrode,
b. workpiece erosion signal means for forming a signal representative of the rate of erosion of the workpiece,
c. computer means having first, second and third inputs and an output, the first and second inputs respectively being connected to the outputs of the tool erosion signal means and the workpiece erosion signal means to receive the signals formed thereby, and the third input being for connection to receive, by way of data input means, a signal representative of a factor ($\alpha$) which indicates a predetermined desired relationship of the rate of erosion of the tool electrode to the rate of erosion of the workpiece, said computer means being operable for combining said signals to form, at its output, an output signal (P) which has a value within a limited range and which is indicative of the correspondence between the actual relationship and the said desired relationship of therate of erosion of the tool electrode to the rate of erosion of the workpiece.

DETAILED DESCRIPTION

For a better understanding of the invention and to show how the same may be carried into effect reference will now be made, by way of example, to the accompanying drawings, the single FIGURE of which is a block diagram of a control system according to the invention, and parts of an electro-erosion machine tool to which the system is connected.

In the drawing, the block 10 represents the control information input part of the control system. On a data storage medium 10' which may be a punched strip, a punched card, a magnetic tape or the like, the operating parameters, for each individual working stage of the erosion process are fed-in, taking account of the work planning with regard to process optimisation. A reading device comprised in the part 10 reads this information and forms signals representing the information. The signals may be coded, recomputed or converted as appropriate to the particular installation but in any case eventually pass out of the part 10 via signal lines 11 to 14. For clarity, only the four lines 11 to 14 are shown but it will be understood that in practice there could be substantially more than four. As previously described, the operating parameters are sub-divided into two groups. The first group called the preset variables include the current amplitude, voltage amplitude, width of the working pulses, and the desired value voltage while the second group called control variables include the throughflow quantity or the pressure of the flushing medium in the working gap 3 between the tool electrode 1 and workpiece 2, the mark-to-space ratio or duty factor of the working pulses, the repetition frequency of the working pulses, the duration of the periods between the working pulses and the periodic lifting-off of the tool electrode 1 from the workpiece electrode 2, (this resulting in periodic widening of the working gap 3). Signals representing both groups of variables pass out of input part 10, via the lines 11, 12, 13, 14 to part 500 which includes a control unit for the flushing medium, an erosion generator and a control unit for the feed or the servo-feed movement of the tool electrode 1. The signals representing the preset variables pass to the erosion generator where they cause the erosion generator to operate accordingly. These preset variables, once set, normally remain constant throughout the erosion process. The signals representing the desired control variables pass to the appropriate items contained in the part 500 to provide an initial setting of these variables.

From the erosion generator, working pulses pass via the lines 501 and 502 to the tool and workpiece electrodes 1, 2 and discharge across working gap 3, provided that the right conditions obtain therein. Via the line 503, the flushing or scavenging medium is controlled. In the case of the embodiment shown, the flushing medium enters a flushing bore formed in the workpiece electrode 2 and passes from there into the working gap 3. Via the line 504, signals are fed to the feed device 5. Thereby, the spacing between the two electrodes 1, 2 is held constant to correspond to progress of the erosion process. Furthermore, there pass via the line 504 the signals which cause periodic lift-off of the tool electrode 1 from the workpiece electrode 2. In a practical embodiment of the described arrangement, there may be more control functions and correspondingly more control lines leading from the part 500 to appropriate other parts of the arrangement. For clarity, such other lines have not been shown — it being thought sufficient for understanding the invention to show only the lines 501 to 504 and to describe the control functions associated therewith.

Signals representative of the conditions obtaining in the working gap 3 pass via the lines 61 and 62 to a detector 6 which detects the actual instantaneous condition in gap 3. Detector 6 transmits signals indicative of the actual instantaneous condition in the working gap 3 over line 63 to a comparator 4. From the part 10, there are sent to the comparator 4 via line 15, signals which represent desired values of the said instantaneous condition, these desired values being received by the part 10 from the data storage medium 10'. The comparator 4 compares the actual and commanded, or desired values with each other and transmits on its output line 41 a signal representative of the control error *e* which results when the desired-actual comparison does not show correspondence. The control error signal *e* on the line 41 is employed, in the actuator arrangement 500, to modify the control variables. When the desired-actual comparison in the comparator 4 yields correspondence, the error signal *e* remains equal to zero which signifies that the machining is proceeding satisfactory so the control variables remain constant. If however the error signal *e* becomes other than zero, then the control variables are adjusted appropriately to bring the error signal *e* back towards zero. Further information about these control procedures with the aid of the control error signal *e* may be found in U.S. Pat. No. 3,859,186 and 3,975,607.

The error signal *e* from the comparator 4 also passes via the line 42 to an evaluation stage 100. In this evaluation stage, the error signal *e* is integrated over successive time intervals and the successive integrated values are compared with each other. If, due to instabiliy of the erosion process, differences arise between the successive integrated values, then these differences are correspondingly evaluated. The stage 100 thus functions as a stability analyzer. This is very precisely described in the already mentioned U.S. Pat. No. 3,975,607, corresponding to Swiss Pat. No. 548,256. The integrated values are combined to form a quadratic mean value of the control error. In addition, stage 100 provides a signal which is representative of the rate of erosion of the tool electrode 1, by combining the integrated error signals with a signal representative of a command value. The quadratic mean value is processed as follows: From the part 10, there passes a desired value voltage via the line 16 to the stability analyzer where the desired value voltage is squared. The quadratic mean value of the control error *e* is then divided by the squared desired value voltage, so that on the output line 101 a normalised mean value *z* appears and is transmitted to a performance evaluation circuit arrangement 300. The normalised mean value *z* of the control error signal *e* is representative of the amount of the wear taking place at the active erosion surface of the tool electrode 1 in the working gap 3.

Signals indicative of the actual instantaneous conditions are developed in a workpiece erosion generator 200. Signals representing conditions at the working gap 3 formed by the detector 6, also pass over line 61' to a signal generator 200, formed as a comparator counting circuit. The working pulses which discharge across the working gap 3 from the electrode to the other as well as the so-called "idle" pulses which are generated by the erosion generator and which appear at the working gap 3 but do not for one reason or another discharge across it are separately counted. The two countings are compared with one another to form an output signal representative of the rate of machining of the workpiece, i.e. the rate of removal, at the erosion front, of material from the workpiece electrode 3. Since signal generator 200 analyzes actual working pulses with respect to commanded pulses from actuator 500, it can be termed a pulse analyzer. The machining rate output signal is fed via a line 201 to the performance evaluation circuit arrangement 300.

In the installation 10, the data storage medium carries, in addition to data about the operating parameters, a further data item which is indicative of the desirable rate of machining of the workpiece electrode 2 and the allowable rate of wear of the tool electrode 1. This data item is given in the form of an evaluation factor α which is predetermined during work planning. As already stated, removal and wear are closely connected with each other and, thus, the one can not be considered independently of the other. Thus, during work planning, it is necessary to decide for each working stage (coarse erosion, finishing, fine erosion, very fine erosion), whether, for technical or economic considerations, removal or wear is to be considered as being more in the foreground of consideration. Such an evaluation factor α is determined during the work planning either for the entire erosion process or for each individual working stage of the erosion process. If the erosion process is to comprise only two working stages, then the evaluation factor α may be the same for both working stages (i.e. for the entire erosion process). In this case, the evaluation factor α influences the erosion for each working stage in such manner that the control variables are varied and, thus, optimum physical conditions obtain in the working gap 3. If the erosion process comprises a plurality of working stages and if a complicated geometry is to be produced as the final product of the erosion process, then it is to be recommended to determine for each working stage or for two or three adjacent working stages, a respective evaluation factor α during work planning. In the present embodiment, the evaluation factor is a number which can have a value between zero and 1 inclusive. If, then, the mode of operation is to be removal-intensive, as in coarse erosion, the in work planning the evaluation factor $\alpha =$ zero or $\alpha = 0.2$ is set. This means that the erosion process is controlled in accordance with the fact that removal at the workpiece electrode 2 is to be considerable and wear, since unfortunately it is very closely coupled with the desired removal, is also considerable. If, during work planning, it is decided that for technical or economic considerations the working stage must be performed with a lower degree of wear, then the evaluation factor $\alpha = 0.8$ or $\alpha = 1$ is set. This is a typical instance of the working stage for finishing or fine erosion or very fine erosion.

The various values of the evaluation factors are stored by the information carrier so that they will be extracted by the data reader in the part 10 in the order in which they will be needed as the erosion operation progresses through its various stages. At the appropriate time, a signal representative of the required factor value passes via the line 17 into the circuit arrangement 300. In the circuit arrangement, there are thus available as input signals: on the line 101, the wear rate as the tool electrode 1; on the line 201, the removal rate at the workpiece electrode 2; and on the line 17, the evaluation factor α for evaluation of removal and wear. In the arrangement 300 there is a computer which calculates a performance index signal P in accordance with the following equation:

$$p = \alpha I_V + (1 - \alpha) I_\delta \qquad (1)$$

In this equation:

$I_V$ = wear at the tool electrode 1, $I_\delta$ = removal at the workpiece electrode 2

α = is the predetermined factor having a value between 0 and 1.

The signal P represents the combination of the removal and wear to be performed in the erosion process, including the evaluation of these two factors desired in the work planning and is fed via line 301 to a controller circuit 400, which in dependence upon signal P initiates a search procedure for the optimum individual setting of the control variables.

It will now be assumed that, due to the signal P of the line 301, a search process to find the optimum throughflow quantity $q$ of the flushing medium has been started in the circuit 400. The circuit 400 can be designed in the manner described in the articles "10 ways to find the optimum" by J.M. Idelson ("Control Engineering" June 1964). Such a search process is described in detail in U.S. Pat. No. 3,975,607. In small steps $\Delta q$, the throughflow quantity $q$ of the flushing medium is varied. The variation signal passes out of the circuit 400, via the line 18, into the actuator 500 in which is arranged the unit for controlling the flushing medium. Then, via the line 503, the throughflow quantity $q$ is varied. As an alternative, it could be the pressure of the flushing medium which is varied in small steps.

Due to each variation in the throughflow quantity or pressure of the flushing medium the conditions in the working gap 3 also vary and this, via the lines 61, 62, the detector 6, the comparator 4, the circuit 100 and the circuit 200, shows itself in a change of the control error signal $e$ or the square and normalised mean value $z$ of this control error signal (indicating a change in the removal capacity). These changes are taken account of in the computer of the performance evaluation arrangement 300 (according to equation 1) in such manner that the signal P from the line 301 also undergoes a change. It is not yet possible to say whether this change in the signal P does or does not lead to the optimum erosion process. In the circuit 400, the next search process follows for the mark-to-space ratio or duty factor γ or for the duration $t$ of the pauses between the working pulses. During this search procedure, these control variables are varied in small steps α γ, $\Delta t$. The corresponding signal passes via the line 19 to the erosion generator which supplies the working pulses to the electrodes 1 and 2 via the lines 501 and 502. By means of the elements 4, 6,100, 200 and 300, it is then established whether the control error is larger or smaller than in the case of the previous search procedure. If the control error $e$ has become smaller, then this means that the search process has contributed to optimisation of the erosion process. The signal P on the line 301 indicates the corresponding change. Then, in the following circuit 400 a further search process is initiated, for example the search process to establish the optimum repetition frequency of the working pulses. The set repetition frequency of the pulses is varied by small steps $\Delta f$. The corresponding signals pass via line 20 to the erosion generator arranged in the installation 500. The physical condition in the working gap 3 also changes correspondingly and this shows itself in the following units of the control circuit in such manner that the control error $e$ has perhaps become still smaller or has increased. If the control error $e$ has become smaller, this signifies that a further step in the direction of optimisation of the erosion process has been taken. If is conceivable that a fourth searching step is effected in the circuit 400, on the basis of the changed signal P on the line 301. This further searching step relates to the optimum rate of periodic lift-off of the tool electrode 1 from the workpiece electrode 2. The corresponding signals then pass via line 21 to the control arrangement for the feed device 5, which said control arrangement is arranged in the installation 500. Via the line 504, the associated interval-wise-liftoff signals are supplied to the feed device 5. Again, as a result of the searching process the control error *e* may have fallen still further, even to the value zero, or it may have increased. If the control error has been decreased to the value zero, this signifies that no further search processes are to be brought about, so that the erosion process is operated with the control variables as available in actuator 500, and that, further, the evaluation factor $\alpha$ has been taken into account to the full extent. If, later, the erosion process deviates from its optimum due to one or another circumstance, the signal P on the line 301 in the circuit arrangement is correspondingly varied and further search processes are carried out by the circuit 400. The same thing happens if the evaluation factor $\alpha$ is varied for example during a changeover from one working stage in the erosion process to another. After each search process it is, as already stated, ascertained whether or not the optimum conditions for the erosion process, as indicated by the signal P, have been attained. Such optimum conditions obtain, in this particular example, when the signal P has adopted its smallest value. Of course, the computation and control circuit elements 300 and 400 can also be so designed that the optimum process condition is attained when the signal P on the line 301 has reached a maximum value.

It should be understood that the arrangement described can be formed by the addition of appropriate parts to already existing regulating and control installation. To clarify how this is done, it may be noted how the described example is based upon the control installation disclosed in the previously mentioned Swiss Pat. No. 548,256 to which U.S. Pat. No. 3,975,607 corresponds.

We claim:

1. A control system for a machine tool of the kind in which electrical energy is passed across a working gap (3) between a tool electrode (1) and a workpiece (2) so as to machine the workpiece by eroding it, and having command means (10, 10') providing a signal indicative of a predetermined desired relationship between rate of erosion of the tool electrode and of the workpiece, respectively, the control system comprising:

tool erosion signal generator means (100) for forming a signal representative of the rate of erosion of the tool electrode (1);

workpiece erosion signal generator means (200) for forming a signal representative of the rate of erosion of the workpiece (2);

computer means (300) having first, second and third inputs (101, 201, 17) and an output (301), the first and second inputs (101, 201) respectively being connected to the outputs of the tool erosion signal generator means (100) and the workpiece erosion signal generator means (200) to receive the signals formed thereby, and the third input (17) being connected to the command means, (10, 10') to receive a signal representative of a factor ($\alpha$) which indicates a predetermined desired relationship of the rate of erosion of the tool electrode to the rate of the workpiece, said computer means (300) being operable for combining said tool erosion rate signal with said factor signal and said workpiece erosion rate signal with said factor signal to form, at its output (301), an output signal (P) which has a value within a limited range and which is is indicative of the correspondence between the actual relationship and the said desired relationship of the rate of erosion of the tool electrode to the rate of erosion of the workpiece.

2. A control system according to claim 1, including control circuit means connected to and controlling operating parameters of the machine tool, the control circuit means being connected to receive said output signal (P) from the computer means (300) to control at least one controllable operating parameter of the machine tool is dependence upon said output signal (P).

3. A control system according to claim 2, wherein said tool erosion signal means (100) comprises a first input (42) for receiving a control error signal (*e*) representative of operating conditions in said working gap of the machine tool, and a second input (16) for receiving a reference signal, the tool erosion signal means being operable for combining the control error signal (*e*) and the reference signal to form said signal which is representative of the rate of erosion of the tool electrode, wherein said workpiece erosion signal means (200) comprises two inputs (61, 62; 61') and includes counter means (a) for counting working pulses of electrical energy which discharge across said gap and which effect erosion of said workpiece, and (b) for counting idle energy pulses which do not contribute to such erosion, and means for comparing the counts of the working pulses and of the idle pulses and for forming a resultant signal which is representative of the actual rate of erosion of the workpiece in dependence upon said counting, and wherein said control circuit means (400,500) includes a search initiating control circuit (400) which is connected to receive said output signal (P) and which is operable for causing said at least one controllable operating parameter to vary according to a search process until an optimum value of said output signal (P) is being received by the said search initiating circuit (400).

4. A control system according to claim 3, wherein said control circuit means includes an output stage (500) which is controlled by the said search initiating control circuit (400) and which has at least one output (501 to 504) connected to the machine tool (1) to control said at least one controllable operating parameter.

5. A control system according to claim 1, wherein the command means include data input means (10) and a data storage medium (10'), said data storage medium storing predetermined control data for the machine tool, said data input means extracting such data to form electrical control signals, the data input means (10) being connected to said computer means (300) for supplying said signals indicative of the predetermined desired relationship between tool erosion rate and work piece erosion rate thereto.

6. A combination of a control system according to claim 1 and the said machine tool, the control system being operably connected to the machine tool to control the operation and the operating parameters of said machine tool.

7. Device for controlling the machining process of an erosion installation for optimum operational conditions on the basis of signals sensed from and collected in the working gap, wherein said working gap is formed by at least one tool electrode (1) and at least one workpiece electrode (2), comprising a computation circuit arrangement (300);

a first circuit connected to said tool electrode and generating signals representing wear of the tool electrode;

a second circuit (200) connected to the workpiece and sensing removal of the workpiece;

an input device (10) storing data commanding predetermined wear of the tool electrode; predetermined removal rate of the workpiece; and a factor (α) forming a preset evaluation factor of relative workpiece removal and tool electrode wear and representative of optimum predetermined progression of said machining process, the computation circuit arrangement (300) having the signals from said first and second circuit and the evaluation factor signal applied thereto and providing an output signal (P) correlating said electrode wear signal, said workpiece removal signal and said evaluation signal to provide an output representing for each working stage of the erosion process an optimum combination between removal and wear;

a control circuit and a sequentially arranged actuating circuit, the control and actuating circuits being connected to said tool electrode and said workpiece to control at least one of the control variables influencing the erosion process;

the output (301) of the computation circuit arrangement (300) being connected to said control circuit and said sequentially arranged actuating circuit to form a closed operating loop as follows: the process operating circuit (500);

the tool electrode (1), the workpiece (2) and the gap (3);

the tool electrode wear signal generating means (100) delivering the tool electrode wear rate signal and the workpiece removal signal generating means (200) delivering the workpiece removal rate signal, both said signal generating means having their inputs and outputs connected in parallel;

the computation circuit arrangement (300);

the control circuit (400);

and back to the actuating circuit (500);

wherein the operating conditions of the loop are determined by the computation circuit arrangement under control of said preset evaluation factor (α) and which computes the ratio of relative control effect obtained in the closed loop by the signal based on the tool electrode wear rate and on the workpiece removal rate to thereby optimize said process, the computation circuit arrangement (300) output signal (P) controlling said controller circuit (400) to influence at least one of the control variables of the erosion process to optimize the erosion process such that the output signal (P) from the computation circuit arrangement (300) will reach an extreme value.

* * * * *